(12) United States Patent
Hsiao et al.

(10) Patent No.: US 8,509,317 B2
(45) Date of Patent: Aug. 13, 2013

(54) METHOD AND RELATED DEVICE FOR DETECTING SIGNALS IN A TMDS TRANSMISSION SYSTEM

(75) Inventors: Chiao-Wei Hsiao, Taichung (TW); Kuo-Chi Chen, Hsinchu County (TW); Shyr-Chyau Luo, Kaohsiung (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 1016 days.

(21) Appl. No.: 12/551,577

(22) Filed: Sep. 1, 2009

(65) Prior Publication Data

US 2010/0215130 A1    Aug. 26, 2010

(30) Foreign Application Priority Data

Feb. 25, 2009    (TW) ................................ 98105950 A

(51) Int. Cl.
*H04B 3/00*    (2006.01)
(52) U.S. Cl.
USPC ........... 375/257; 348/441; 375/244; 375/259; 375/286; 375/288; 375/340; 725/127

(58) Field of Classification Search
None
See application file for complete search history.

(56) References Cited

U.S. PATENT DOCUMENTS

2010/0283894 A1* 11/2010 Horan et al. .................. 348/441
2011/0154428 A1*  6/2011 Keady et al. .................. 725/127

* cited by examiner

*Primary Examiner* — Adolf Dsouza
(74) *Attorney, Agent, or Firm* — Winston Hsu; Scott Margo

(57) ABSTRACT

A method for detecting signals in a TMDS transmission system having a channel established between a receiver and a transmitter includes separating loadings of the receiver from the channel, providing a first reference current in a first differential line of the channel, providing a second reference current in a second differential line of the channel, computing a difference between the first reference current and a current provided by the transmitter via the first differential line to obtain a first current difference, computing a difference between the second reference current and a current provided by the transmitter via the second differential line to obtain a second current difference, and determining an operating state of the transmitter according to the first current difference and the second current difference.

45 Claims, 10 Drawing Sheets

METHOD AND RELATED DEVICE FOR
DETECTING SIGNALS IN A TMDS
TRANSMISSION SYSTEM

BACKGROUND OF THE INVENTION

1. Field of the Invention

The present invention is related to a method and related device for detecting signals in a TMDS transmission system, and more particularly, to a method and related device capable of correctly determining an operating state of a transmitter in the TMDS transmission system.

2. Description of the Prior Art

With the advancement of multimedia technology, people demand more and more digital video products, such as next generation video game consoles, digital TVs, DVD players, and etc. In order to transmit digital video data, the industry advanced a high definition multimedia interface (HDMI), which is developed from a digital visual interface (DVI). The HDMI utilizes a transition minimized differential signaling (TMDS) method for coding signals to transmit high definition video signals and multi-channel audio signals.

Please refer to FIG. 1, which is a schematic diagram of a TMDS transmission system 10 of the prior art. The TMDS transmission system 10 includes a transmitter TX, a receiver RX and channels TMDS_CH0 to TMDS_CH3. In the TMDS transmission system 10, the channels TMDS_CH0 to TMDS_CH2 are utilized for transmitting video and audio signals, and the channel TMDS_CH3 is for clock signals.

Please continue to refer to FIG. 2, which is a schematic diagram of an arbitrary channel TMDS_CHx of the channels TMDS_CH0 to TMDS_CH3 in FIG. 1. As illustrated in FIG. 2, the channel TMDS_CHx is composed of a first differential line L1 and a second differential line L2. The receiver RX part of the channel TMDS_CHx (right half of FIG. 2) comprises a detection circuit 200 and resistors 202, 204, and the transmitter TX part thereof (left half of FIG. 2) comprises a current source 206 and switches 102, 104. The detection circuit 200 utilizes an edge detection method to analyze voltage waveforms of the first differential line L1 and the second differential line L2, so as to determine whether the transmitter TX transmits data via the channel TMDS_CHx, such that the receiver RX can accordingly determine whether to start receiving signals or remain in standby.

In FIG. 2, currents $I_{TX1}$, $I_{TX2}$ passing through the current source 206 are completely provided by the receiver RX. However, due to limitations caused by HDMI specifications, if the receiver RX detects an operating state of the transmitter TX while the transmitter TX is operating in a transmitting state, the receiver RX will be forced to supply the currents $I_{TX1}$, $I_{TX2}$. Under such condition, in order to more efficiently utilize current resources of the receiver RX, the prior art must reduce a detection current $I_{RX}$ provided by the receiver RX when the receiver RX detects the operating state of the transmitter TX. However, loadings of the receiver RX are composed of two passive elements—resistors 202, 204—which cannot actively control the current passing through themselves. Thus, the current resources of the receiver RX are still dominated by the transmitter, so that the detection current $I_{RX}$ cannot be effectively reduced.

SUMMARY OF THE INVENTION

It is therefore a primary objective of the claimed invention to provide a method and related device for detecting signals in a transition minimized differential signal (TMDS) transmission system.

The present invention discloses a method for detecting signals in a TMDS transmission system. A channel of the TMDS system is established between a receiver and a transmitter. The method comprises separating loadings of the receiver from the channel, providing a first reference current in a first differential line of the channel, providing a second reference current in a second differential line of the channel, computing a difference between the first reference current and a current provided by the transmitter via the first differential line to obtain a first current difference, computing a difference between the second reference current and a current provided by the transmitter via the second differential line to obtain a second current difference, and determining an operating state of the transmitter according to the first current difference and the second current difference.

The present invention further discloses a device for detecting signals in a TMDS transmission system. A channel of the TMDS system is between a receiver and a transmitter. The device comprises a separation device for separating loadings of the receiver from the channel, a first current source for providing a first reference current in a first differential line of the channel, a second current source for providing a second reference current in a second differential line of the channel, and a determination module coupled to the first current source, the second current source, the first differential line and the second differential line for determining an operating state of the transmitter according to a first current difference and a second current difference, wherein the first current difference is a difference between the first reference current and a current provided by the transmitter via the first differential line, and the second current difference is a difference between the second reference current and a current provided by the transmitter via the second differential line.

The present invention further discloses a method for detecting signals in a TMDS transmission system. A channel of the TMDS system is between a receiver and a transmitter. The method comprises acquiring a first voltage of a first differential line of the channel, acquiring a second voltage of a second differential line of the channel, computing a peak voltage of the first voltage and the second voltage; and determining an operating state of the transmitter according to the peak voltage.

The present invention further discloses a device for detecting signals in a TMDS transmission system. A channel of the TMDS system is between a receiver and a transmitter. The device comprises a computing unit coupled to a first differential line of the channel at a first node and coupled to a second differential line of the channel at a second node for computing a peak voltage of a first voltage corresponding to the first node and a second voltage corresponding to the second node, and a determination module coupled to the computing unit for determining an operating state of the transmitter according to the peak voltage.

The present invention further discloses a device for detecting signals in a TMDS transmission system. A channel of TMDS system is between a receiver and a transmitter. The device comprises a first current source for providing a first reference current in a first differential line of the channel, a second current source for providing a second reference current in a second differential line of the channel, a first separation device for separating loadings of the receiver from the channel, a second separation device for separating the first current source from the first differential line, and separating the second current source from the second differential line, a control unit for controlling the second separation device, and a determination module coupled to the first differential line at a first node and coupled to the second differential line at a second node for determining an operating state of the transmitter according to a first current difference and a second current difference, wherein the first current difference is a difference between the first reference current and a current provided by the transmitter via the first differential line, and the second current difference is a difference between the second reference current and a current provided by the transmitter via the second differential line.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
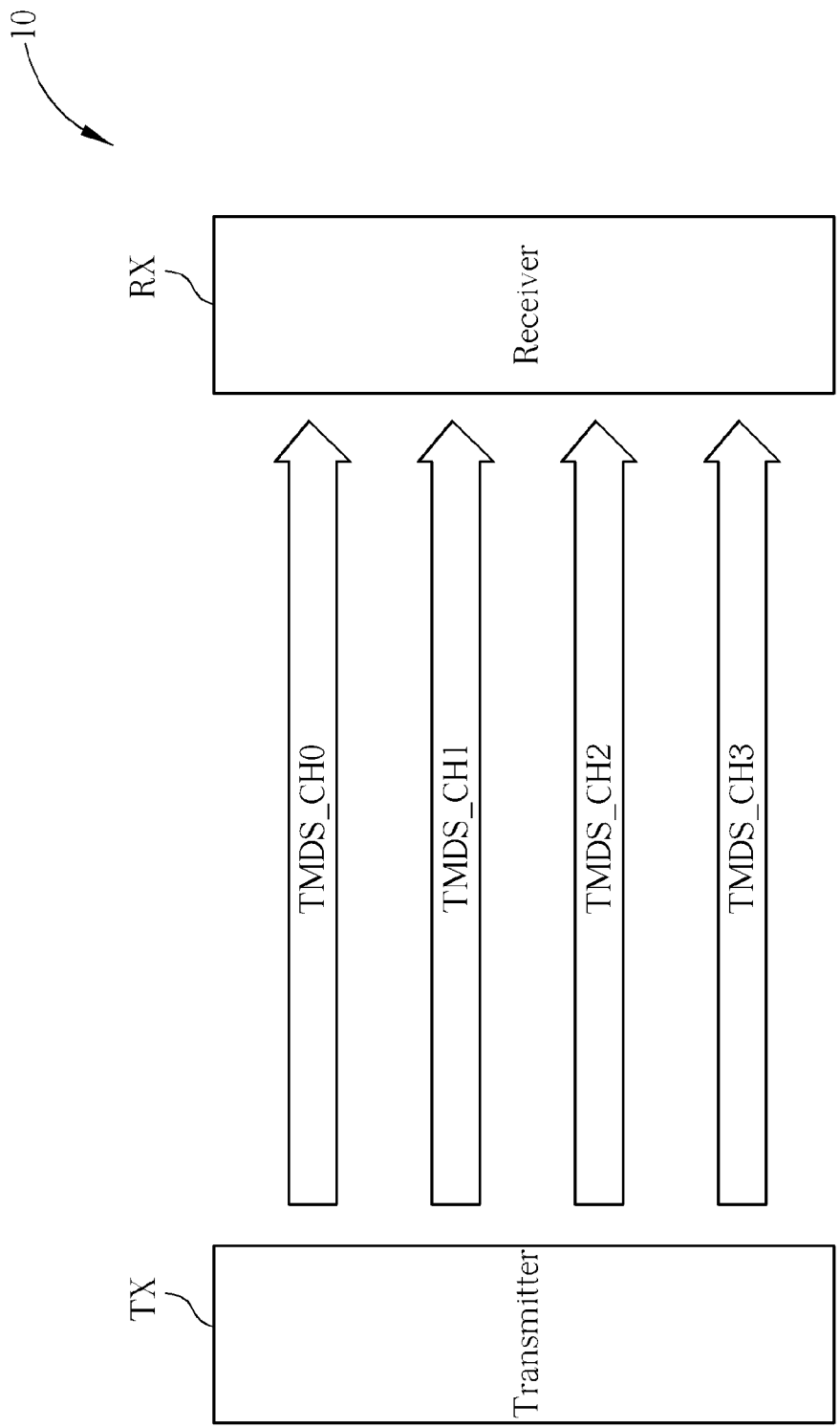
FIG. 1 is a schematic diagram of a TMDS transmission system of the prior art.
Figure 2:
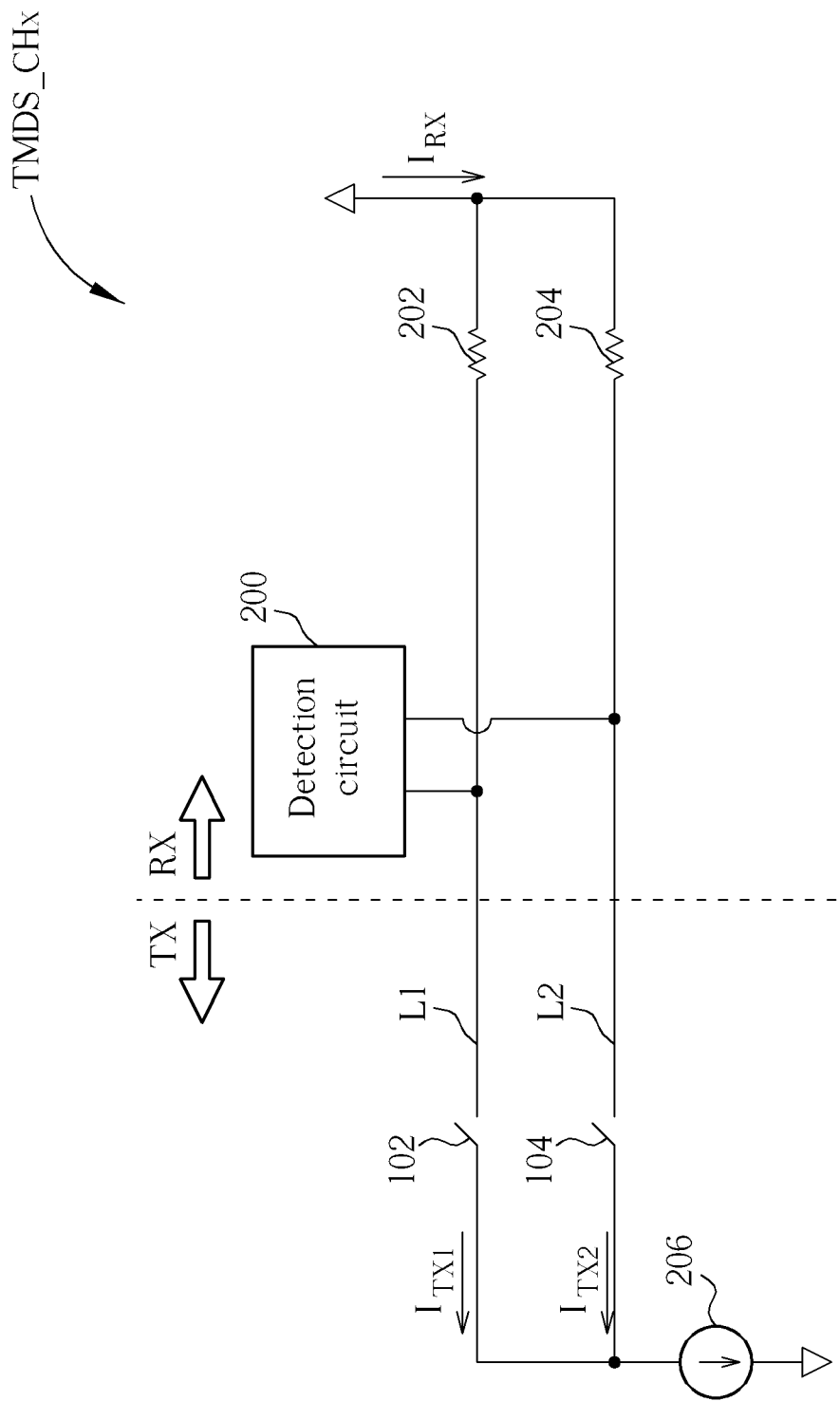
FIG. 2 is a schematic diagram of an arbitrary channel in FIG. 1.
Figure 3A:
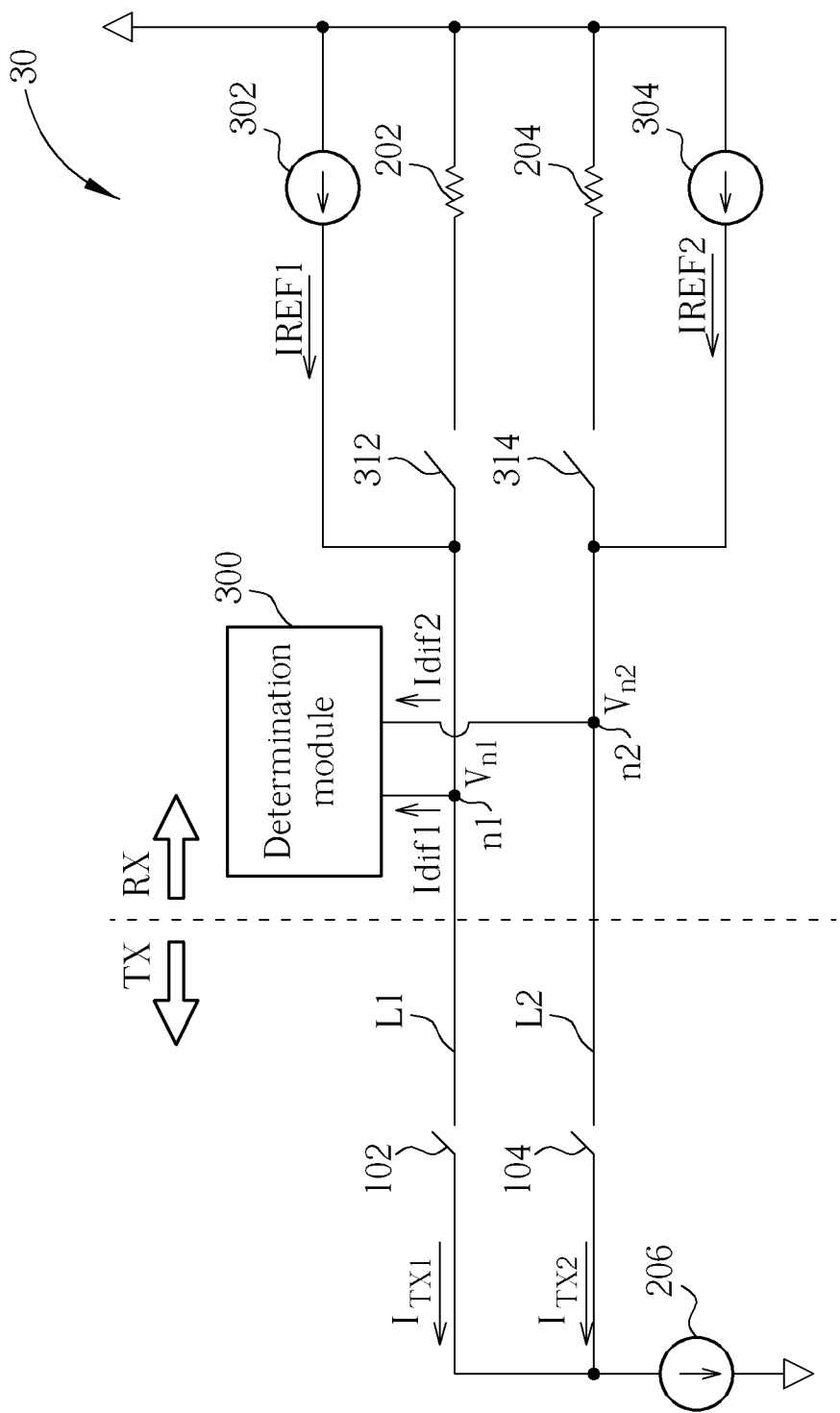
FIG. 3A is a schematic diagram of a device for detecting signals according to an embodiment of the present invention.

Please refer to FIG. 3A, which is a schematic diagram of a device 30 for detecting signals according to an embodiment of the present invention. The device 30 is utilized in the receiver RX of the transition minimized differential signal (TMDS) transmission system 10 in FIG. 1 for detecting a signal transmitting state of an arbitrary channel TMDS_CHx. The device 30 comprises a first current source 302, a second current source 304, and a determination module 300. Compared with FIG. 2, in addition to the first current source 302 and the second current source 304, the device 30 further comprises a first switch 312 and a second switch 314 as separation devices for separating loads of the receiver RX—resistors 202, 204—from the channel TMDS_CHx. The first current source 302 is utilized for providing a first reference current IREF1 in a first differential line1 L1, and the second current source 304 is utilized for providing a second reference current IREF2 in a second differential line L2. In addition, in FIG. 3A, a first node n1 is the connection point of the first current source 302, the transmitter TX and the determination module 300 for acquiring a first current difference Idif1 which is the difference between the first reference current IREF1 and a current $I_{TX1}$. Similarly, a second node n2 is the connection point of the second current source 304, the transmitter TX and the determination module 300 for acquiring a second current difference Idif2 which is the difference between the second reference current IREF2 and a current $I_{TX2}$. The determination module 300 is coupled to the first node n1 and the second node n2, and is utilized for determining an operating state of the transmitter TX according to the first current difference Idif1 and the second current difference Idif2.

In short, the device 30 acquires the first current difference Idif1 and the second current difference Idif2 via the first node n1 and the second node n2, respectively, and accordingly determines the operating state of the transmitter TX. As a result, according to different requirements, a circuit designer can actively control current provided by the receiver RX—a summation of the first reference current IREF1 and the second reference current IREF2—by means of the first current source 302 and the second current source 304, so as to determine the operating state of the transmitter TX. Note that the device 30 can be utilized for detecting the signal transmitting state of an arbitrary channel (TMDS_CH0 to TMDS_CH3). That is, signals transmitted through the first differential line L1 and the second differential L2 can be a pair of differential clock signals or a pair of differential data signals.

No matter what kinds of signals may be transmitted through the channel TMDS_CHx, magnitudes of the current $I_{TX1}$ and $I_{TX2}$ differ with the operating state of the transmitter TX. For that reason, a summation of the first reference current IREF1 and the second reference current IREF2 is preferably designed to be greater than a summation of currents provided by the transmitter TX when the transmitter TX is in standby, and to be less than the summation of currents provided by the transmitter TX when the transmitter TX transmits data. For example, when the transmitter TX is in standby, the device 30 may shut down the current source 206, reduce the current throughput thereof, or utilize switches 102, 104 to form a open circuit, such that the summation of currents provided by the transmitter TX when the transmitter TX is in standby, i.e. $I_{TX1}+I_{TX2}$, is less than the summation of the first reference current IREF1 and the second reference current IREF2. That is, the summation of the first current difference Idif1 and the second current difference Idif2 is greater than zero, i.e. Idif1+Idif2=IREF1+IREF2−$I_{TX1}$−$I_{TX2}$>0. On the contrary, when the transmitter TX transmits data, the summation of the first current difference Idif1 and the second current difference Idif2 is less than zero, i.e. Idif1+Idif2=IREF1+IREF2−$I_{TX1}$−$I_{TX2}$<0. As a result, the determination module 300 can determine the operating state of the transmitter TX according to the first current difference Idif1 and the second current difference Idif2.

Figure 3B:
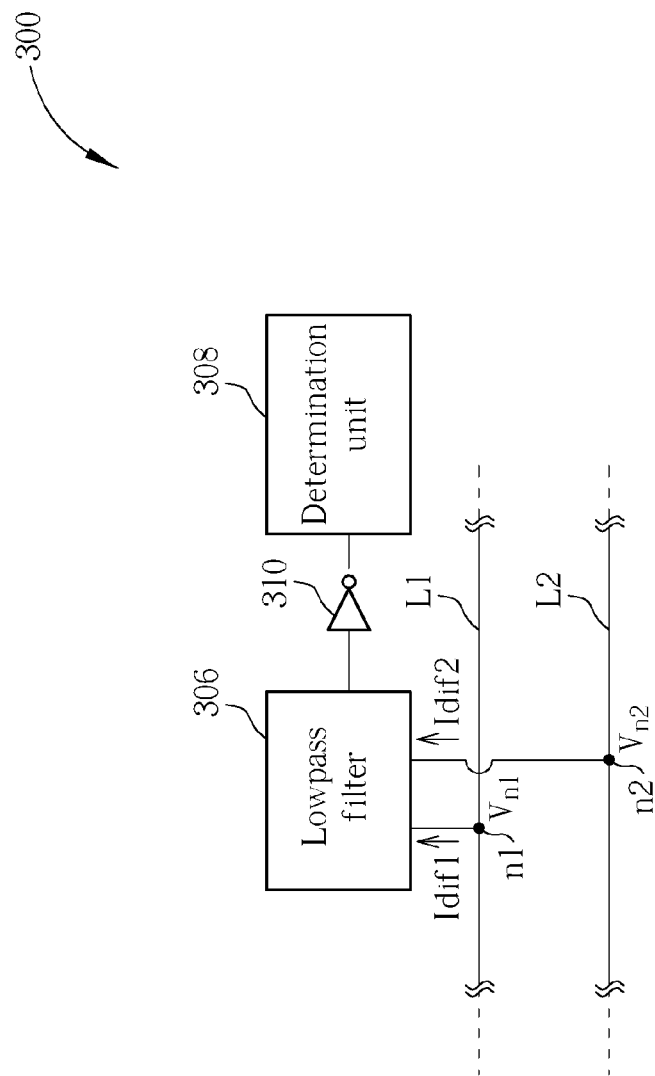
FIG. 3B is a schematic diagram of a determination module in FIG. 3A according to an embodiment of the present invention.

Please continue to refer to FIG. 3B, which is a schematic diagram of the determination module 300 in FIG. 3A according to an embodiment of the present invention. The determination module 300 comprises a lowpass filter 306, a determination unit 308 and an inverter 310. The lowpass filter 306 is coupled to the first node n1 and the second node n2 for performing a lowpass filtering operation on a first node voltage $V_{n1}$ and a second node voltage $V_{n2}$ to generate a lowpass filtered result. The inverter 310 is utilized for inverting the lowpass filtered result of the lowpass filter 306 to generate an inverted signal to the determination unit 308, such that the determination unit 308 can accordingly determine the operating state of the transmitter TX. Preferably, when the summation of the first current difference Idif1 and the second current difference Idif2 is greater than a default value, the determination unit 308 can determine that the transmitter TX is operating in a standby state; when the summation of the first current difference Idif1 and the second current difference Idif2 is less than the default value, the determination unit 308 can determine the transmitter TX is operating in a transmitting state.

In greater detail, when the transmitter TX is in standby, the summation of the first current difference Idif1 and the second current difference Idif2 is greater than zero, i.e. Idif1+Idif2>0, such that the average of the first node voltage $V_{n1}$ and the second node voltage $V_{n2}$ corresponds to a higher voltage level. On the contrary, when the transmitter TX transmits data, the summation of the first current difference Idif1 and the second current difference Idif2 is less than zero, i.e. Idif1+Idif2<0, such that the average of the first node voltage $V_{n1}$ and the second node voltage $V_{n2}$ corresponds to a lower voltage level. The lowpass filter 306 is utilized for acquiring a common mode voltage VCM of the voltages $V_{n1}$ and $V_{n2}$ by means of the lowpass filtering operation. The common mode voltage VCM differs with the operating state of the transmitter TX. For that reason, the determination unit 308 can determine the operating state of the transmitter TX according to the common mode voltage VCM. For example, when the summation of the first current difference Idif1 and the second current difference Idif2 is greater than zero, i.e. Idif1+Idif2>0, and the common mode voltage VCM is thereby a common mode high voltage, whose inverted result corresponds to the lower voltage level, the determination unit 308 determines that the transmitter TX is operating in the standby state. On the contrary, when the summation of the first current difference Idif1 and the second current difference Idif2 is less than zero, i.e. Idif1+Idif2<0, and the common mode voltage VCM is thereby a common mode low voltage, whose inverted result corresponds to the higher voltage level, the determination unit 308 determines that the transmitter TX is operating in the transmitting state.

As a result, by means of current comparison, the device 30 can correctly determine the operating state of the transmitter TX. Meanwhile, by means of the first current source 302 and the second current source 304, the receiver RX can actively control its current throughput—the summation of the first reference current IREF1 and the second reference current IREF2—instead of the transmitter TX.

Figure 4:
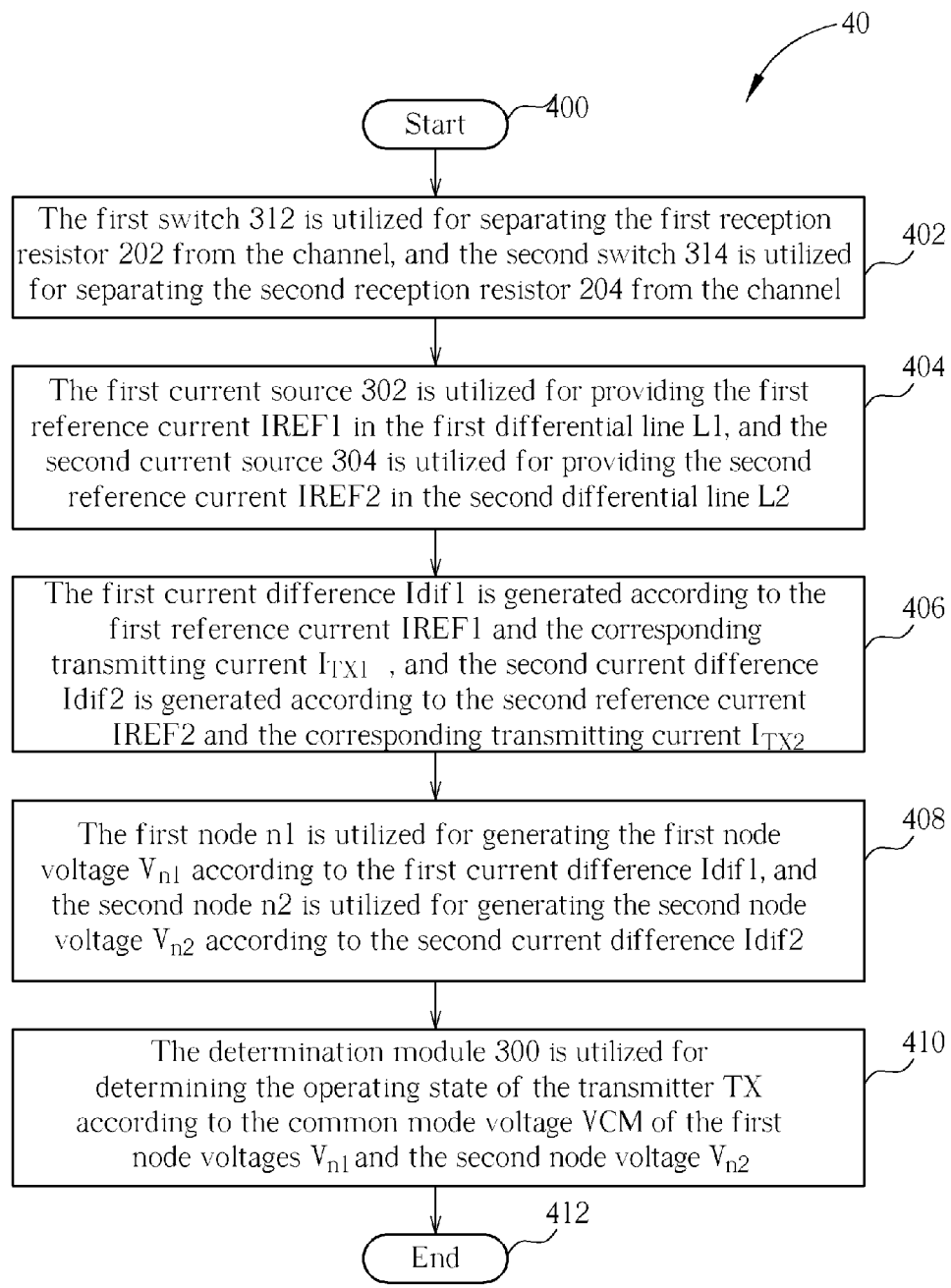
FIG. 4 is a schematic diagram of a process for detecting signals according to an embodiment of the present invention.

Operating methods of the device 30 can be summarized in a process 40 for detecting signals, as illustrated in FIG. 4. The process 40 comprises the following steps:

Step 400: Start.

Step 402: The first switch 312 is utilized for separating the first reception resistor 202 from the channel, and the second switch 314 is utilized for separating the second reception resistor 204 from the channel.

Step 404: The first current source 302 is utilized for providing the first reference current IREF1 in the first differential line L1, and the second current source 304 is utilized for providing the second reference current IREF2 in the second differential line L2.

Step 406: The first current difference Idif1 is generated according to the first reference current IREF1 and the corresponding transmitting current $I_{TX1}$, and the second current difference Idif2 is generated according to the second reference current IREF2 and the corresponding transmitting current $I_{TX2}$.

Step 408: The first node n1 is utilized for generating the first node voltage $V_{n1}$ according to the first current difference Idif1, and the second node n2 is utilized for generating the second node voltage $V_{n2}$ according to the second current difference Idif2.

Step 410: The determination module 300 is utilized for determining the operating state of the transmitter TX according to the common mode voltage VCM of the first node voltages $V_{n1}$ and the second node voltage $V_{n2}$.

Step 412: End.

Detailed description of the process 40 can be referred in the above and is not given herein for the sake of brevity.

Figure 5:
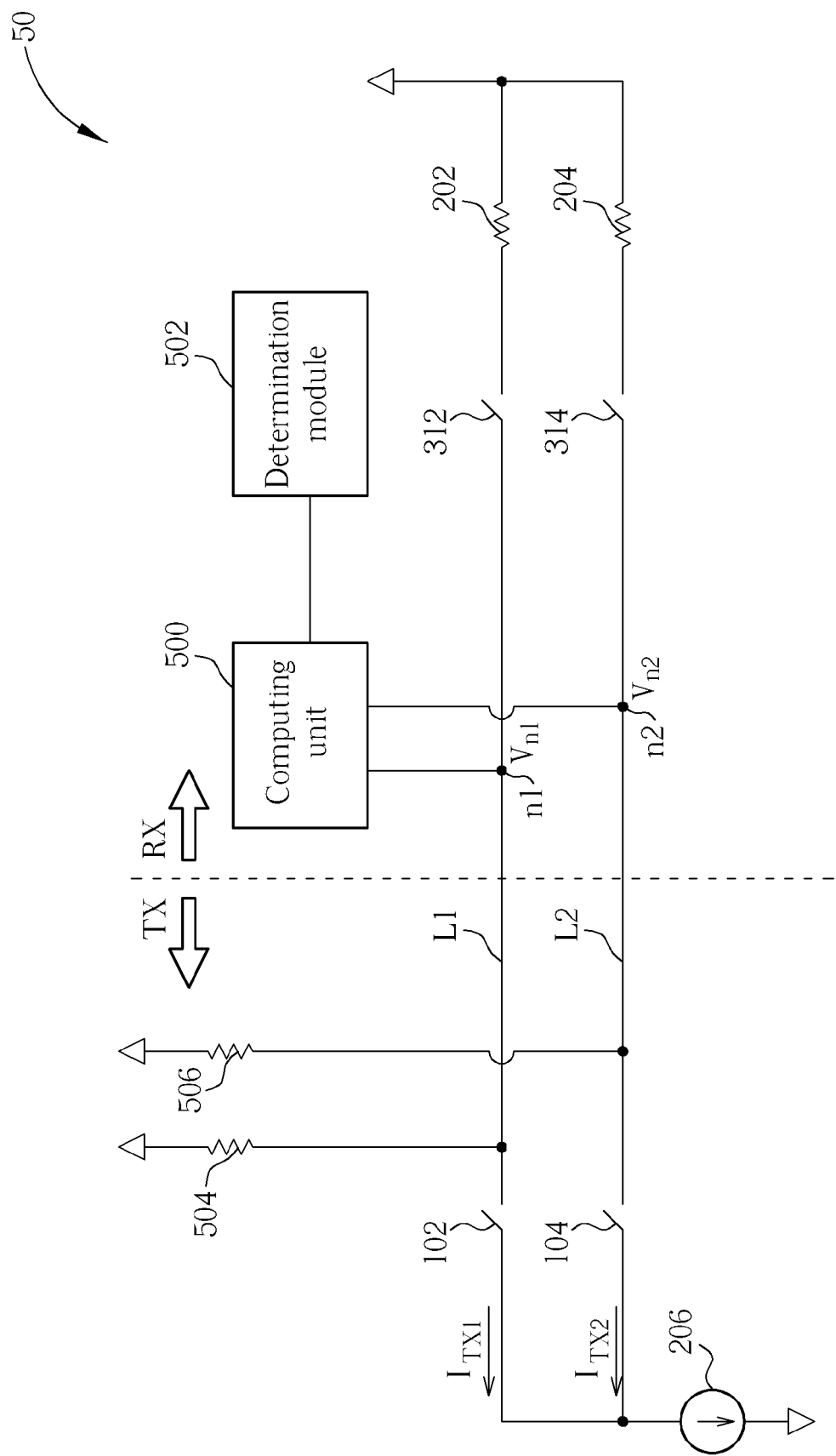
FIG. 5 is a schematic diagram of a device for detecting signals according to an embodiment of the present invention.

Through the device 30, the receiver RX can determine the operating state of the transmitter TX. However, except for the structure of the transmitter TX illustrated in FIG. 3A, in some cases, the transmitter TX may include terminal resistors 504, 506, as illustrated in FIG. 5. In such a situation, the currents $I_{TX1}$, $I_{TX2}$ are no longer completely provided by the receiver RX, but are partially provided by the transmitter TX, making the device 30 unsuitable for application to the transmitter TX whose architecture includes the terminal resistors 504, 506. Therefore, with respect to the transmitter TX whose architecture includes the terminal resistors 504, 506, a device 50 for detecting signals is provided. The device 50 comprises the first switch 312, the second switch 314, a computing unit 500 and a determination module 502. The computing unit 500 is coupled to the first node n1 and the second node n2 for computing a peak voltage VPK of the first node voltage $V_{n1}$ and the second node voltage $V_{n2}$. The determination module 502 is coupled to the computing unit 500 for determining the operating state of the transmitter TX according to the peak voltage VPK.

In comparison with the device 30, the device 50 is utilized for determining the operating state of the transmitter TX by means of voltage comparison. For example, when the transmitter TX transmits data, the node voltages $V_{n1}$, $V_{n2}$ correspond to a high peak voltage $VPK_H$. On the contrary, when the transmitter TX is in standby, the node voltages $V_{n1}$, $V_{n2}$ correspond to a low peak voltage $VPK_L$. As a result, the determination module 502 can determine the operating state of the transmitter TX according to the peak voltage VPK.

Figure 6:
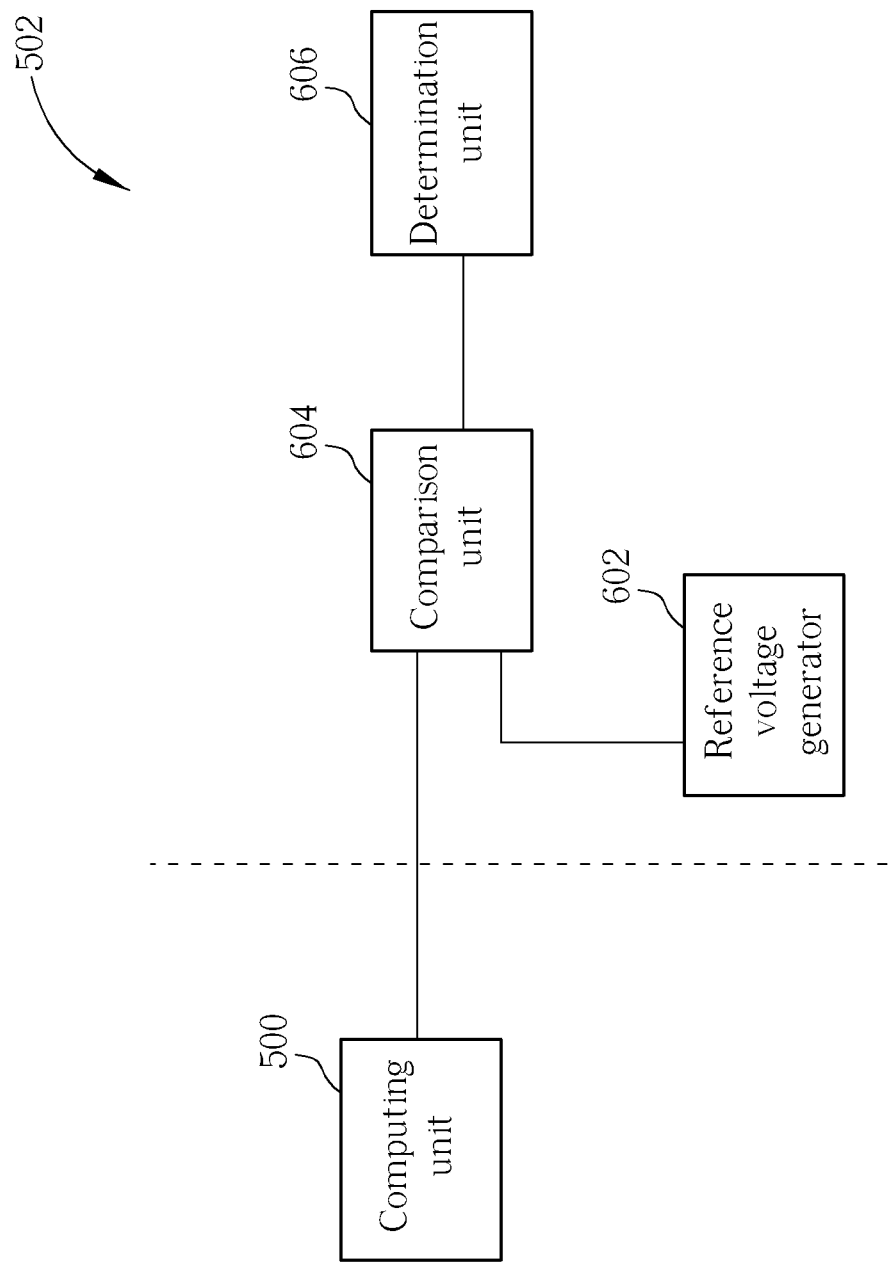
FIG. 6 is a schematic diagram of a determination module in FIG. 5 according to an embodiment of the present invention.

Preferably, the computing unit 500 can be implemented by a rectifier for rectifying the first node voltage $V_{n1}$ and the second node voltage $V_{n2}$ to acquire the peak voltage VPK. As a result, the determination module 502 can determine the operating state of the transmitter TX according to the peak voltage VPK. Please continue to refer to FIG. 6, which is a schematic diagram of the determination module 502 in FIG. 5 according to an embodiment. In FIG. 6, the determination module 502 comprises a reference voltage generator 602, a comparison unit 604 and a determination unit 606. The reference voltage generator 602 is utilized for generating a reference voltage VREF. The comparison unit 604 is utilized for comparing the peak voltage VPK and the reference voltage VREF to generate a comparison result VCMP. The determination unit 606 is utilized for determining the operating state of the transmitter TX according to the comparison result VCMP.

When designing the voltage generator 602, the circuit designer can preferably design the reference voltage VREF to be less than the high peak voltage $VPK_H$ and greater than the low peak voltage $VPK_L$. As a result, the determination module 502 can correctly determine the operating state of the transmitter TX. For example, when the peak voltage VPK is greater than the reference voltage VREF, the comparison unit 604 can output the comparison result VCMP with the higher voltage level, such that the determination unit 606 can accordingly determine that the transmitter TX is operating in the transmitting state. On the contrary, when the peak voltage VPK is less than the reference voltage VREF, the comparison unit 604 can output the comparison result VCMP with the lower voltage level, such that the determination unit 606 can accordingly determine that the transmitter TX is operating in the standby state.

Figure 7:
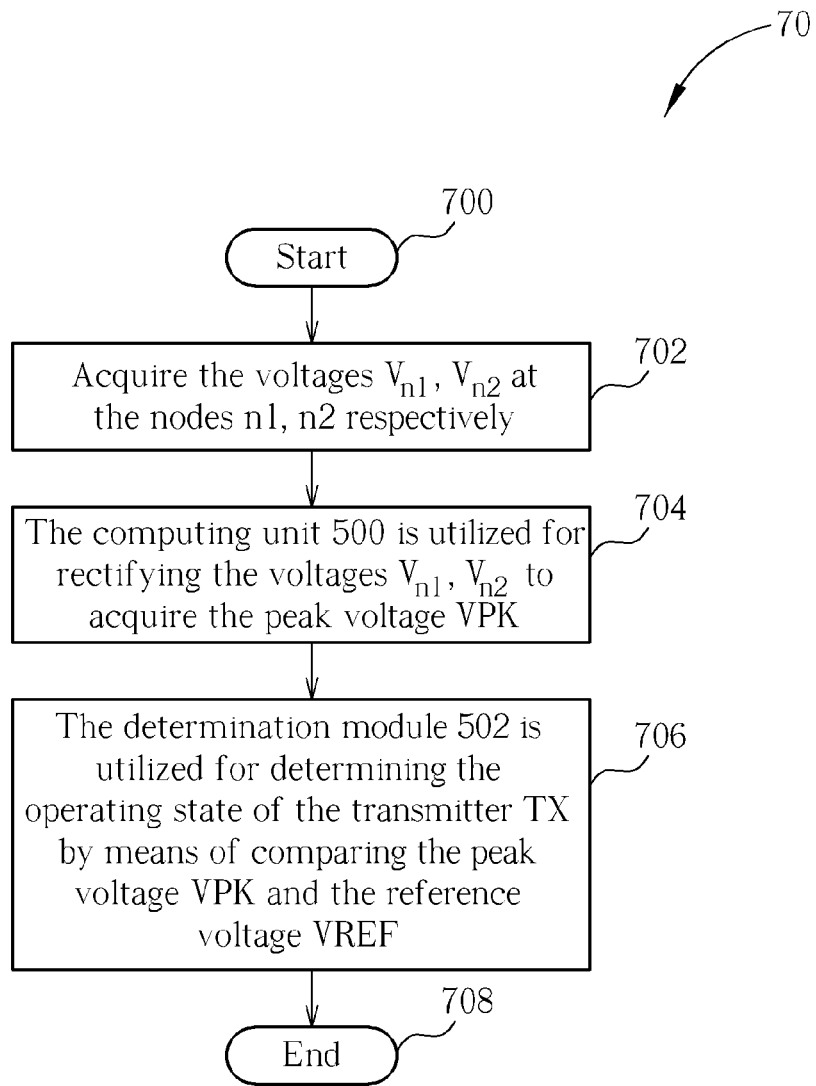
FIG. 7 is a schematic diagram of a process for detecting signals according to an embodiment of the present invention.

Operating methods of the device 50 can be summarized in a process 70 for detecting signals, as illustrated in FIG. 7. The process 70 comprises the following steps:

Step 700: Start.

Step 702: Acquire the voltages $V_{n1}$, $V_{n2}$ at the nodes n1, n2 respectively.

Step 704: The computing unit 500 is utilized for rectifying the voltages $V_{n1}$, $V_{n2}$ to acquire the peak voltage VPK.

Step 706: The determination module 502 is utilized for determining the operating state of the transmitter TX by means of comparing the peak voltage VPK and the reference voltage VREF.

Step 708: End.

Detailed description of the process 70 can be referred in the above and is not given herein for the sake of brevity.

Figure 8:
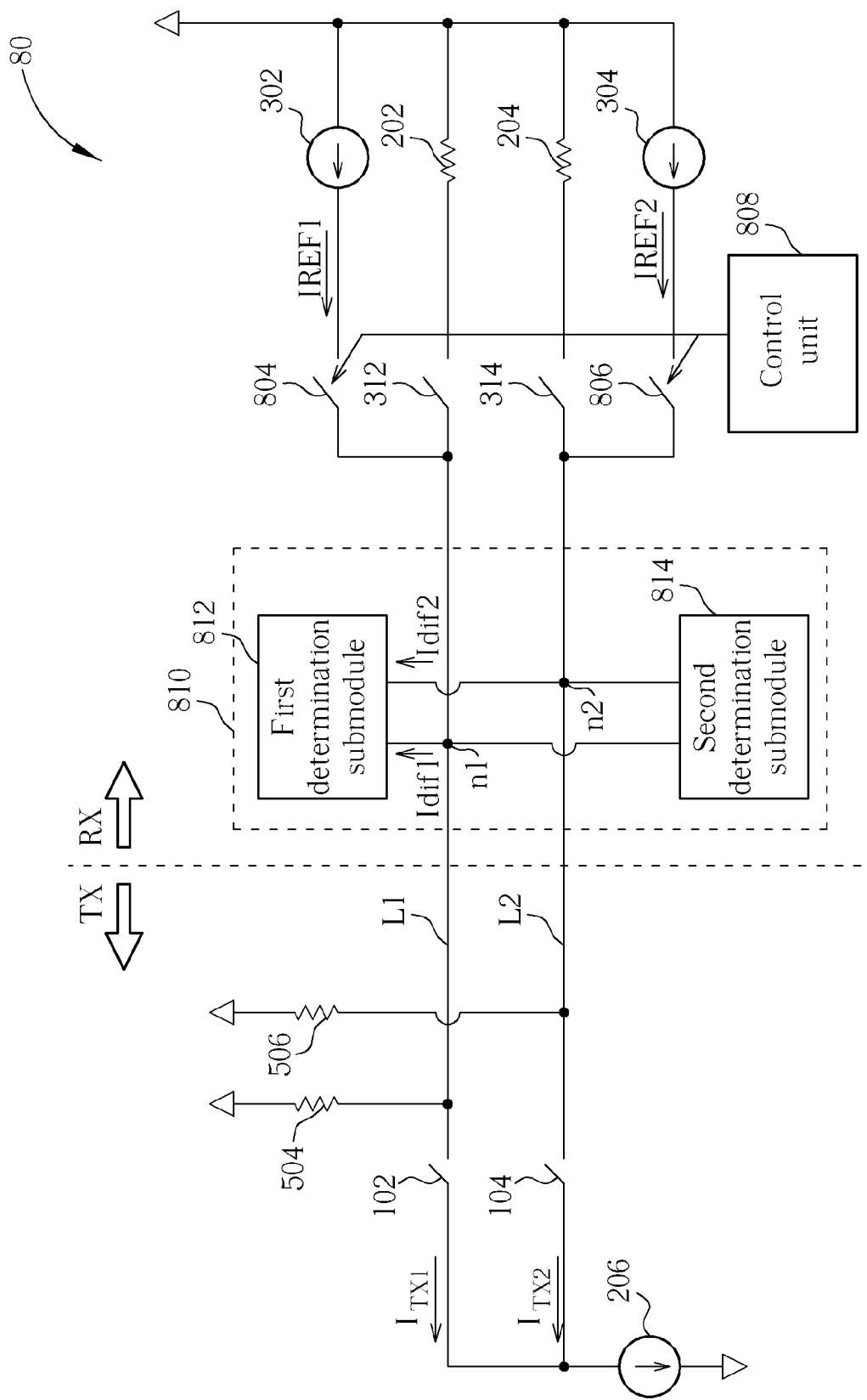
FIG. 8 is a schematic diagram of a device for detecting signals according to an embodiment of the present invention.
Figure 9:
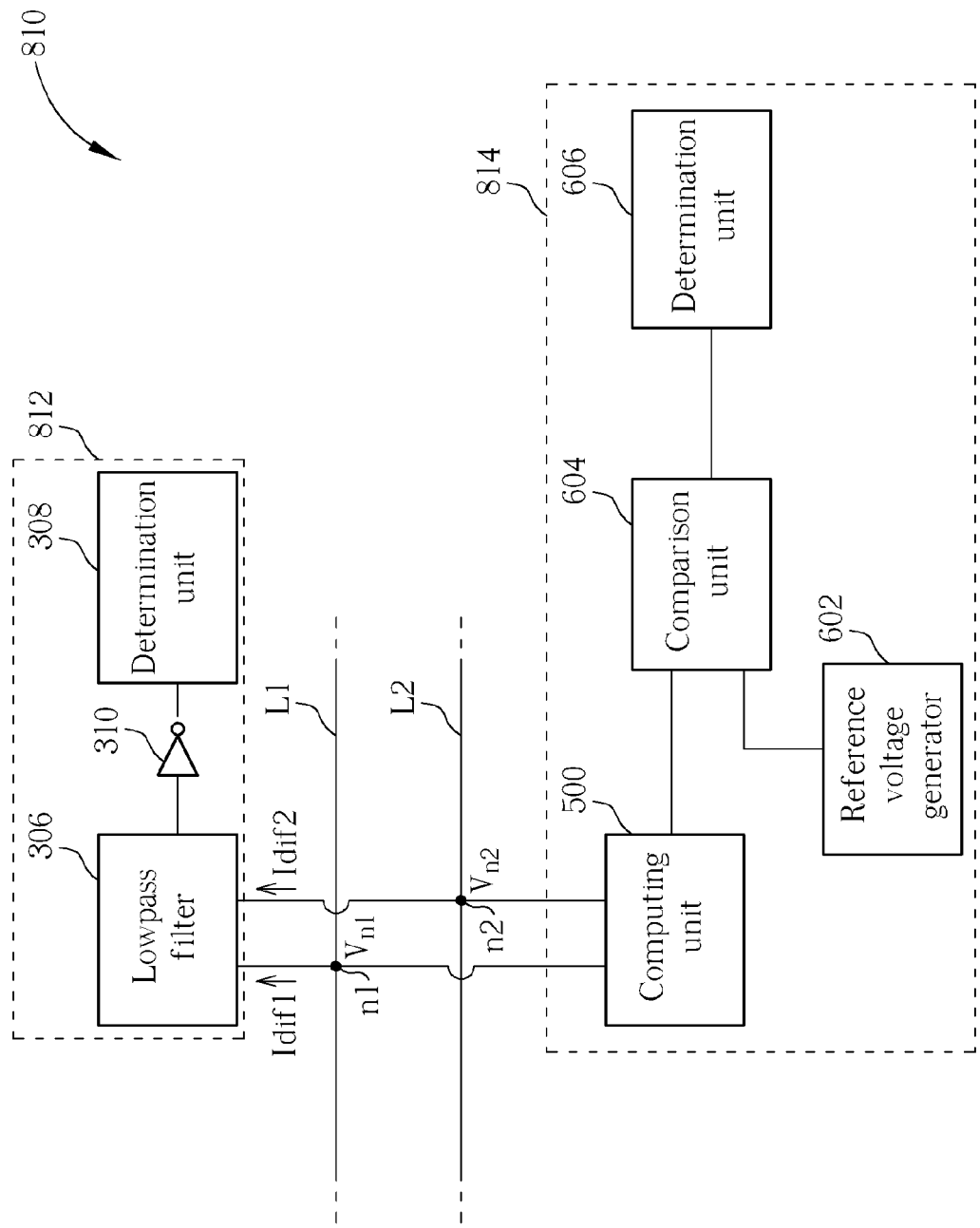
FIG. 9 is a schematic diagram of a determination module in FIG. 8 according to an embodiment of the present invention.

By means of the device 30 or the device 50, the receiver RX can determine the operating state of the transmitter TX. However, the devices 30, 50 are applied to different cases—without or with the terminal resistors 504, 506 in the transmitter TX—respectively. In such a situation, a device 80 for detecting signals is further provided, as illustrated in FIG. 8. The device 80 combines the device 30 and the device 50, and adds a third switch 804, a fourth switch 806, a control unit 808 and a determination module 810 to vary operating methods thereof with the architecture of the transmitter TX. The first switch 312 is coupled between the first node n1 and the resistor 202; the second switch 314 is coupled between the second node n2 and the resistor 204; the third switch 804 is coupled between the first node n1 and the first current source 302; the fourth switch 806 is coupled between the second node n2 and the second current source 304. In addition, the control unit 808 is utilized to control whether to turn on/off the first switch 312, the second switch 314, the third switch 804 and the fourth switch 806, such that the device 80 can be switched between different detection modes. The determination module 810 combines the determination module 300 in FIG. 3A and the determination module 502 in FIG. 5, and comprises a first determination submodule 812 and a second determination submodule 814, as illustrated in FIG. 9. The device 80 is utilized for determining the operating state of the transmitter TX according to the currents Idif1, Idif2 or the voltages $V_{n1}$, $V_{n2}$ on the first node n1 and the second node n2.

When the transmitter TX does not include the terminal resistors 504, 506, the control unit 808 turns off the first switch 312 and the second switch 314, and turns on the third switch 804 and the fourth switch 806 to switch the device 80 to a current detection mode. That is, in the current detection mode, the first determination submodule 812 is utilized for determination, and operation methods thereof can be referred from the operation methods of the device 30. On the contrary, when the transmitter TX includes the terminal resistors 504, 506, the control unit 808 turns off the third switch 804 and the fourth switch 806 to switch the device 80 to a voltage detection mode. That is, in the voltage detection mode, the second determination submodule 814 is utilized for determination, and operation methods thereof can be referred from the operation methods of the device 50. As a result, regardless of whether or not the terminal resistors 504, 506 are included in the transmitter TX, the device 80 can accordingly switch to the corresponding detection mode to correctly determine the operating state of the transmitter TX.

In the prior art, since loadings of the receiver RX are composed of two passive resistors which cannot actively control the current passing through themselves, current dissipation of the receiver RX cannot be effectively reduced. In comparison, the devices 30, 50, 80 can effectively reduce the current dissipation of the receiver RX, and provide different detection modes for different structures of the transmitter TX by means of an integrated device for detecting signals, so as to be implemented in a more general application.

To sum up, for a TMDS transmission system, the devices 30, 50, 80 can reduce current dissipation of the receiver during detection, such that current resources of the receiver can be utilized more efficiently; meanwhile, the corresponding detection modes are provided for different transmitter architectures, such that the receiver can correctly determine the operating state of the transmitter.

Those skilled in the art will readily observe that numerous modifications and alterations of the device and method may be made while retaining the teachings of the invention.

What is claimed is:

1. A method for detecting signals in a transition minimized differential signal (TMDS) transmission system, a channel of the TMDS system established between a receiver and a transmitter, the method comprising:
   separating loadings of the receiver from the channel;
   providing a first reference current in a first differential line of the channel;
   providing a second reference current in a second differential line of the channel;
   computing a difference between the first reference current and a current provided by the transmitter via the first differential line to obtain a first current difference;
   computing a difference between the second reference current and a current provided by the transmitter via the second differential line to obtain a second current difference; and
   determining an operating state of the transmitter according to the first current difference and the second current difference.

2. The method of claim 1, wherein the channel is utilized for transmitting a differential clock signal.

3. The method of claim 1, wherein the channel is utilized for transmitting a differential data signal.

4. The method of claim 1, wherein a summation of the first reference current and the second reference current is greater than a summation of current received by the transmitter via the first differential line and the second differential line when the transmitter is in standby, and is less than the summation of current received by the transmitter via the first differential line and the second differential line when the transmitter transmits data.

5. The method of claim 1, wherein determining the operating state of the transmitter according to the first current difference and the second current difference comprises:
   performing a lowpass filtered operation on a first node voltage and a second node voltage to generate a lowpass filtering result; and
   determining the operating state of the transmitter according to the lowpass filtered result;
   wherein the first node voltage corresponds to the first current difference, and the second node voltage corresponds to the second current difference.

6. The method of claim 5, wherein determining the operating state of the transmitter according to the lowpass filtered result comprises determining the operating state of the transmitter according to an inverted lowpass filtered result.

7. The method of claim 5, wherein determining the operating state of the transmitter according to the lowpass filtered result comprises determining that the transmitter is operating in a standby state when the lowpass filtered result indicates that a summation of the first current difference and the second current difference is greater than a default value.

8. The method of claim 5, wherein determining the operating state of the transmitter according to the lowpass filtered result comprises determining the transmitter is operating in a transmitting state when the lowpass filtered result indicates that the summation of the first current difference and the second current difference is less than the default value.

9. A device for detecting signals in a transition minimized differential signal (TMDS) transmission system, a channel of the TMDS system between a receiver and a transmitter, the device comprising:
   a separation device for separating loadings of the receiver from the channel;
   a first current source for providing a first reference current in a first differential line of the channel;
   a second current source for providing a second reference current in a second differential line of the channel; and
   a determination module coupled to the first current source, the second current source, the first differential line and the second differential line for determining an operating state of the transmitter according to a first current difference and a second current difference;
   wherein the first current difference is a difference between the first reference current and a current provided by the transmitter via the first differential line, and the second current difference is a difference between the second reference current and a current provided by the transmitter via the second differential line.

10. The device of claim 9, wherein the channel is utilized for transmitting a differential clock signal.

11. The device of claim 9, wherein the channel is utilized for transmitting a differential data signal.

12. The device of claim 9, wherein a summation of the first reference current and the second reference current is greater than a current received by the transmitter when the transmitter is in standby, and is less than a current received by the transmitter when the transmitter transmits data.

13. The device of claim 9, wherein the determination module comprises:
   a lowpass filter for performing a lowpass filtering operation on a first node voltage and a second node voltage, to generate a lowpass filtered result; and
   a determination unit coupled to the lowpass filter for determining the operating state of the transmitter according to the lowpass filtered result;
   wherein the first node voltage corresponds to the first current difference, and the second node voltage corresponds to the second current difference.

14. The device of claim 13, wherein the determination unit is utilized for determining the transmitter is operating in a standby state when the lowpass filtered result indicates that a summation of the first current difference and the second current difference is greater than a default value.

15. The device of claim 13, wherein the determination unit is utilized for determining the transmitter is operating in a transmitting state when the lowpass filtered result indicates that the summation of the first current difference and the second current difference is less than the default value.

16. The device of claim 9, wherein the determination module comprises:
   a lowpass filter for performing a lowpass filtering operation on a first node voltage and a second node voltage, to generate a lowpass filtered result;
   an inverter coupled to the lowpass filter for inverting the lowpass filtered result, to generate an inverted signal; and
   a determination unit coupled to the lowpass filter for determining the operating state of the transmitter according to the inverted signal;
   wherein the first node voltage corresponds to the first current difference, and the second node voltage corresponds to the second current difference.

17. The device of claim 9, wherein the device is installed in the receiver.

18. A method for detecting signals in a transition minimized differential signal (TMDS) transmission system, a channel of the TMDS system between a receiver and a transmitter, the method comprising:
   acquiring a first voltage of a first differential line of the channel;
   acquiring a second voltage of a second differential line of the channel;
   computing a peak voltage of the first voltage and the second voltage; and
   determining an operating state of the transmitter according to the peak voltage.

19. The method of claim 18, wherein computing the peak voltage of the first voltage and the second voltage comprises rectifying the first voltage and the second voltage to acquire the peak voltage.

20. The method of claim 18, wherein determining the operating state of the transmitter according to the peak voltage comprises:
   generating a reference voltage;
   comparing the peak voltage and the reference voltage to generate a comparison result; and
   determining the operating state of the transmitter according to the comparison result.

21. The method of claim 20, wherein determining the operating state of the transmitter according to the comparison result comprises determining the transmitter is operating in a transmitting state when the comparison result indicates that the peak voltage is greater than the reference voltage.

22. The method of claim 20, wherein determining the operating state of the transmitter according to the comparison result comprises determining the transmitter is operating in a standby state when the comparison result indicates that the peak voltage is less than the reference voltage.

23. The method of claim 18, wherein the channel is utilized for transmitting a differential clock signal.

24. The method of claim 18, wherein the channel is utilized for transmitting a differential data signal.

25. A device for detecting signals in a transition minimized differential signal (TMDS) transmission system, a channel of the TMDS system between a receiver and a transmitter, the device comprising:
   a computing unit coupled to a first differential line of the channel at a first node and coupled to a second differential line of the channel at a second node for computing a peak voltage of a first voltage corresponding to the first node and a second voltage corresponding to the second node; and
   a determination module coupled to the computing unit for determining an operating state of the transmitter according to the peak voltage.

26. The device of claim 25, wherein the computing unit comprises a rectifier for rectifying the first voltage and the second voltage to acquire the peak voltage.

27. The device of claim 26, wherein the determination module comprises:
   a reference voltage generator for generating a reference voltage;
   a comparison unit coupled to the reference voltage generator and the computing unit for comparing the peak voltage and the reference voltage to generate a comparison result; and
   a determination unit for determining the operating state of the transmitter according to the comparison result.

28. The device of claim 27, wherein the determination unit determines the transmitter is operating in a transmitting state when the comparison result indicates that the peak voltage is greater than the reference voltage.

29. The device of claim 27, wherein the determination unit determines the transmitter is operating in a standby state when the comparison result indicates that the peak voltage is less than the reference voltage.

30. The device of claim 25, wherein the channel is utilized for transmitting a differential clock signal.

31. The device of claim 25, wherein the channel is utilized for transmitting a differential data signal.

32. The device of claim 25, wherein the device is installed in the receiver.

33. A device for detecting signals in a transition minimized differential signal (TMDS) transmission system, a channel of TMDS system between a receiver and a transmitter, the device comprising:
a first current source for providing a first reference current in a first differential line of the channel;
a second current source for providing a second reference current in a second differential line of the channel;
a first separation device for separating loadings of the receiver from the channel;
a second separation device for separating the first current source from the first differential line, and separating the second current source from the second differential line;
a control unit for controlling the second separation device; and
a determination module coupled to the first differential line at a first node and coupled to the second differential line at a second node for determining an operating state of the transmitter according to a first current difference and a second current difference;
wherein the first current difference is a difference between the first reference current and a current provided by the transmitter via the first differential line, and the second current difference is a difference between the second reference current and a current provided by the transmitter via the second differential line.

34. The device of claim 33, wherein in a current detection mode, the control unit utilizes the first separation device to separate the loadings of the receiver from the channel, and utilizes the second separation device to link the first current source and the first differential line, and to link the second current source and the second differential line.

35. The device of claim 33, wherein in a voltage detection mode, the control unit utilizes the second separation device to separate the first current source from the first differential line, and to separate the second current source from the second differential line.

36. The device of claim 33, wherein the determination module comprises:
a first determination submodule comprising:
a lowpass filter coupled to the first node and the second node for performing a lowpass filtering operation on a first node voltage corresponding to the first node and a second node voltage corresponding to the second node to generate a lowpass filtered result; and
a first determination unit coupled to the lowpass filter for determining the operating state of the transmitter according to the lowpass filtered result;
wherein the first node voltage corresponds to the first current difference, and the second node voltage corresponds to the second current difference; and
a second determination submodule, comprising:
a computing unit coupled to the first node and the second node for computing a peak voltage of the first node voltage and the second node voltage;
a reference voltage generator for generating a reference voltage;
a comparison unit coupled to the reference voltage generator and the computing unit for comparing the peak voltage and the reference voltage to generate a comparison result; and
a second determination unit for determining the operating state of the transmitter according to the comparison result.

37. The device of claim 36, wherein the computing unit comprises a rectifier for rectifying the first node voltage and the second node voltage to acquire the peak voltage.

38. The device of claim 36, wherein the first determination unit determines the transmitter is operating in a standby state when the lowpass filtered result indicates that a summation of the first current difference and the second current difference is greater than a default value.

39. The device of claim 36, wherein the first determination unit determines the transmitter is operating in a transmitting state when the lowpass filtered result indicates that the summation of the first current difference and the second current difference is less than the default value.

40. The device of claim 36, wherein the second determination unit determines the transmitter is operating in the transmitting state when the comparison result indicates that the peak voltage is greater than the reference voltage.

41. The device of claim 36, wherein the second determination unit determines the transmitter is operating in a standby state when the comparison result indicates that the peak voltage is less than the reference voltage.

42. The device of claim 33, wherein the channel is utilized for transmitting a differential clock signal.

43. The device of claim 33, wherein the channel is utilized for transmitting a differential data signal.

44. The device of claim 33, wherein a summation of the first reference current and the second reference current is greater than a current received by the transmitter when the transmitter is in standby, and is less than the current received by the transmitter when the transmitter transmits data.

45. The device of claim 33, wherein the device is installed in the receiver.

* * * * *